(12) United States Patent
Yoshida

(10) Patent No.: US 7,805,594 B2
(45) Date of Patent: Sep. 28, 2010

(54) MULTITHREAD PROCESSOR AND REGISTER CONTROL METHOD

(75) Inventor: Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1444 days.

(21) Appl. No.: 10/986,142

(22) Filed: Nov. 12, 2004

(65) Prior Publication Data
US 2006/0020776 A1    Jan. 26, 2006

(30) Foreign Application Priority Data
Jul. 26, 2004    (JP)    ............... 2004-217046

(51) Int. Cl.
G06F 9/34 (2006.01)
G06F 9/38 (2006.01)
G06F 9/46 (2006.01)

(52) U.S. Cl. ................... 712/228
(58) Field of Classification Search .......... 712/228, 712/212, 41
See application file for complete search history.

(56) References Cited

U.S. PATENT DOCUMENTS

| | | | | |
|---|---|---|---|---|
| 6,233,599 B1 | 5/2001 | Nation et al. | ............... | 709/102 |
| 6,560,671 B1 * | 5/2003 | Samra et al. | ............... | 711/108 |
| 6,665,793 B1 * | 12/2003 | Zahir et al. | ............... | 712/228 |
| 6,842,853 B1 * | 1/2005 | Bush et al. | ............... | 712/228 |
| 7,093,110 B2 | 8/2006 | Okawa et al. | ............... | 712/228 |
| 7,134,002 B2 * | 11/2006 | Shoemaker | ............... | 712/228 |
| 7,216,216 B1 * | 5/2007 | Olson et al. | ............... | 712/220 |
| 2002/0124157 A1 | 9/2002 | Le et al. | ............... | 712/225 |
| 2003/0061258 A1 * | 3/2003 | Rodgers et al. | ............... | 709/102 |
| 2003/0126415 A1 | 7/2003 | Okawa et al. | | |

FOREIGN PATENT DOCUMENTS

| | | |
|---|---|---|
| JP | 2002-163121 | 6/2002 |
| JP | 2002-287957 | 10/2002 |
| JP | 2003-196086 | 7/2003 |
| JP | 2003-241961 | 8/2003 |

OTHER PUBLICATIONS

Hidaka, Y etal., Multiple Threads in Cyclic Register Windows,1993, IEEE, pp. 131-142.*
Communication from the European Patent Office mailed on Dec. 21, 2007.
Communication mailed from the Japanese Patent Office on Jun. 16, 2009 in the related Japanese patent application No. 2004-217046.

* cited by examiner

*Primary Examiner*—Eric Coleman
(74) *Attorney, Agent, or Firm*—Staas & Halsey LLP

(57) ABSTRACT

The present invention relates to a multithread processor, and this multithread processor comprises a plurality of register windows each provided for each of threads and capable of storing data to be used for instruction processing in an arithmetic unit, a work register capable of mutually transferring data with respect to the plurality of register windows and the arithmetic unit and a multithread control unit for controlling data transfer among the plurality of register windows, the work register and the arithmetic unit on the basis of an execution thread identifier for identifying the thread to be executed in the arithmetic unit. This enables conducting the multithread processing at a high speed.

10 Claims, 12 Drawing Sheets

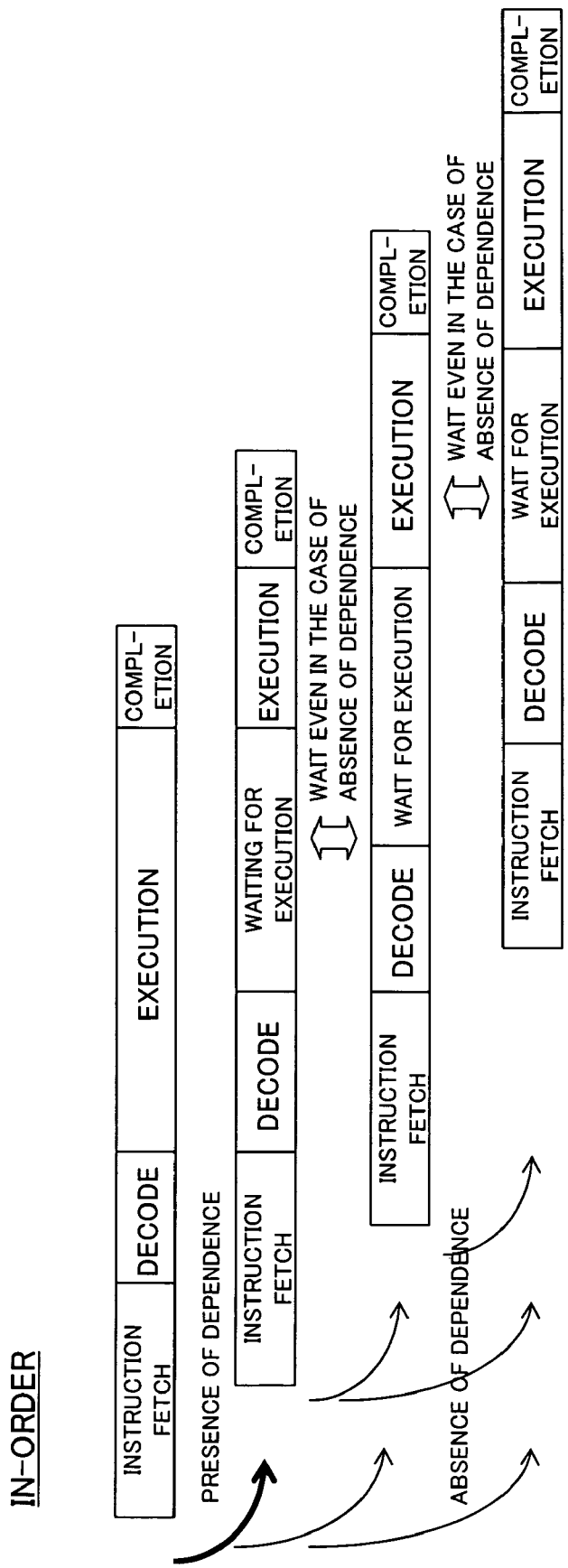

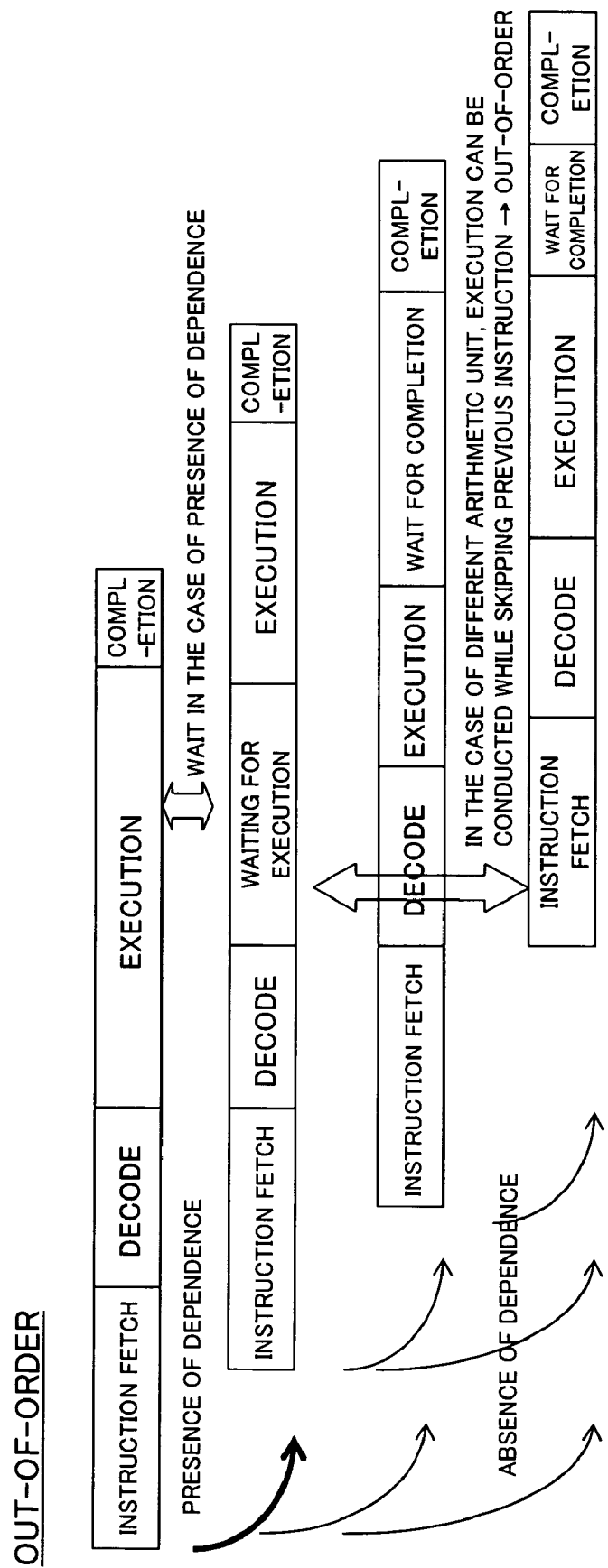

· PROCESSING FOR SINGLE-THREAD IN CPU    ONE PROGRAM A IS PROCESSED BY ONE CPU.

· PROCESSING FOR MULTITHREAD (TWO THREADS) IN CPU    TWO PROGRAMS A AND B ARE PROCESSED BY ONE CPU.

FIG. 11

・SMT (SIMULTANEOUS MULTITHREADING)

| A | A | A | A | B | A |
|---|---|---|---|---|---|
| A | B | A | A | B | A |
| B | B | A | B | B | A |
| B | A | B | B | A | B |

MULTITHREAD PROCESSOR AND REGISTER CONTROL METHOD

BACKGROUND OF THE INVENTION (1) Field of the Invention

The present invention relates to register control for switching between threads in a multithread processor.

(2) Description of the Related Art

In the recent years, as the representatives of computer architectures, in addition to a CISC (Complex Instruction Set Computer) architecture designed to carry out complex processing in accordance with one instruction, there have been known an RISC (Reduced Instruction Set Computer) architecture made to simplify processing to be implemented relative to one instruction, a VLIW (Very Long Instruction Word) made to collect a plurality of simultaneously processible instructions into one long instruction through software, and other architectures.

In addition, the processing methods in a central processing unit (CPU) of a computer for realizing these architectures are roughly classified into two: in-order execution type and out-of-order execution type.

FIG. 8 is an illustration for explaining an in-order execution type processing method, while FIG. 9 is an illustration for explaining an out-of-order execution type processing method. As shown in FIG. 8, the in-order execution type is a method of conducting instruction processing according to a program, and as shown in FIG. 9, the out-of-order execution type is a method of seeing the dependence (dependent relationship) between instructions so that, in the case of an instruction having no dependence, the processing is conducted without following the program sequence.

Furthermore, in the recent years, in addition to single thread processing for carrying out one program (thread) in one processor, attention has been paid to a multithread processor system designed to physically carry out a plurality of threads in parallel in one processor.

FIGS. 10A and 10B are illustrations for explaining a multithread processor system. FIG. 10A is an illustration for explaining single thread processing, while FIG. 10B is an illustration for explaining multithread processing. FIG. 10B shows an example of multithread processing in which two programs A and B are processed in parallel in two CPUs.

In general, in addition to a register visible to software and a status register (CPU status register), a CPU has resources for carrying out the addition, subtraction, multiplication, division, load processing for reading out memory data into a register and software processing for writing register data in a memory. The multithread processor is designed to multiplex registers visible to software in one CPU so that a plurality of programs share an instruction execution resource for addition/subtraction or the like while implementing separate programs (for example, see Japanese Patent Laid-Open No. 2003-241961).

As a method of realizing the above-mentioned multithread processing, in addition to a fine grained multithreading method or simultaneous multithreading (SMT) method (see FIG. 11) which carries out a plurality of threads simultaneously, there has been known as a coarse grained multi-threading method or vertical multithreading (VMT) method (see FIG. 12) which is designed to make the switching to a different thread and implement it in the case of the occurrence of an event such as a cache miss without carrying out a plurality of threads simultaneously.

FIG. 11 is an illustration for explaining the SMT method, while FIG. 12 is an illustration for explaining the VMT method.

The VMT method is for covering up the cache-miss instruction processing which requires a long time, and it is designed to, in the case of the detection of cache miss, make the switching to a different thread and carry out the thread in an execution unit or control unit (both are not shown) with respect to the processing other than a memory access while a cache control unit (not shown) conducts the processing to bring data from a memory to a cache. Moreover, in this VMT method, with respect to threads in which cache miss is hard to develop, the switching to a different thread is made when a given period of time elapses (time-sharing system).

However, for realizing the multithread processing, there is a need for a plurality of threads to share a decoder, arithmetic unit and others in a CPU, and there is a need to multiplex (combine) registers visible to software for each thread. This increases the number of registers to be handled, which enlarges the area corresponding to the registers and delays the register reading processing. Moreover, there is a need to additionally use a selecting circuit for handling the registers which increase in number, which causes a complicated circuit arrangement, thereby likewise delaying the register reading processing.

SUMMARY OF THE INVENTION

The present invention has been developed with a view to eliminating these problems, and it is therefore an object of the present invention to carry out the multithread processing at a high speed.

For this purpose, in accordance with an aspect of the present invention, there is provided a multithread processor which carries out a plurality of threads in parallel through the use of one or more arithmetic units, comprising a plurality of register windows each provided for each of the threads and made to store data to be used for instruction processing in the arithmetic unit, a work register made to mutually transfer the data with respect to the plurality of register windows and the arithmetic unit, and a multithread control unit for controlling data transfer among the plurality of register windows, the work register and the arithmetic unit on the basis of an execution thread identifier for identifying the thread to be processed in the arithmetic unit.

In this case, it is also appropriate that the multithread control unit carries out the register update at the completion of an instruction in the arithmetic unit with respect to the work register and the register window corresponding to the thread related to the instruction completion.

In addition, it is also appropriate that, when making the switching on the thread which is an object of processing in the arithmetic unit, the multithread control unit controls the data transfer so that the updated data is transferred from the register window corresponding to the thread, which becomes an object of execution after the switching, to the work register.

Still additionally, it is also appropriate that, when making the switching on the thread which is an object of processing in the arithmetic unit, the multithread control unit stalls an execution pipeline in an instruction decoding stage until the transfer of the data from the register window corresponding to the thread, which becomes an object of execution after the switching, to the work register reaches completion and the data becomes readable from the work register by the arithmetic unit.

Furthermore, in accordance with an aspect of the present invention, there is provided a multithread processor which carries out a plurality of threads in parallel through the use of one or more arithmetic units, comprising a first register made to store data on, of the plurality of threads, an execution object thread to be executed by the arithmetic unit, a second register (s) made to mutually transfer the data with respect to the first register and made to store data on, of the plurality of threads, a halt thread other than the execution object thread, with the second register being equal in number to the halt thread, and a register control unit for controlling data transfer between the second register and the first register.

In this case, it is also appropriate that a register identification table is provided which is prepared in a state where the halt thread and the second register storing the data on the halt thread are associated with each other so that the register control unit controls the data transfer by referring to the register identification table.

Moreover, it is also appropriate that, when making the switching on the thread which is an object of processing in the arithmetic unit, the register control unit sees the register identification table to select the second register corresponding to the thread which becomes an object of execution after the switching so that the data stored in the selected second register and the data stored in the first register are interchanged with each other and the register identification table is updated on the basis of the data interchange result.

Still moreover, it is also appropriate that the multithread processor further comprises a first register for storing data on, of the plurality of threads, an execution object thread to be executed in the arithmetic unit, a second register made to mutually transfer data with respect to the first register and made to store data on, of the plurality of threads, a halt thread other than the execution object thread, with the second register being equal in number to the halt thread, and a register control unit for controlling data transfer between the first register and the second register.

Yet moreover, it is also appropriate that a register identification table is provided which is prepared in a state where the halt thread and the second register storing the data on the halt thread are associated with each other so that the register control unit controls the data transfer by seeing the register identification table.

In addition, it is also appropriate that, when making the switching on the thread which is an object of processing in the arithmetic unit, the register control unit sees the register identification table to select the second register corresponding to the thread which becomes an object of execution after the switching so that the data stored in the selected second register and the data stored in the first register are interchanged with each other and the register identification table is updated on the basis of the data interchange result.

Furthermore, in accordance with another aspect of the present invention, there is provided a register control method for use in a multithread processor which carries out a plurality of threads in parallel through the use of one or more arithmetic units and including a plurality of register windows each provided for each of the threads and made to store data to be used for instruction processing in the arithmetic unit and a work register made to mutually transfer the data with respect to the plurality of register windows, the method comprising a register updating step of carrying out register update at the completion of an instruction in the arithmetic unit with respect to the work register and the register window corresponding to the thread related to the instruction completion and a data transfer step of, in making the switching of the thread which is an object of processing in the arithmetic unit, transferring the data, updated in the register updating step, from the register window corresponding to the thread, which becomes an object of execution after the switching, to the work register.

In this case, it is also appropriate that the method further comprises a stall step of, in making the switching on the thread which is an object of processing in the arithmetic unit, stalling an execution pipeline in an instruction decoding stage until the transfer of the data from the register window corresponding to the thread, which becomes an object of execution after the switching, to the work register reaches completion and the data becomes readable from the work register by the arithmetic unit.

Still furthermore, in accordance with a further aspect of the present invention, there is provided a register control method for use in a multithread processor which carries out a plurality of threads in parallel through the use of one or more arithmetic units and including a first register made to store data on, of the plurality of threads, an execution object thread to be executed by the arithmetic unit and a second register(s) made to mutually transfer the data with respect to the first register and made to store data on, of the plurality of threads, a halt thread other than the execution object thread, with the second register being equal in number to the halt thread, the register control method comprising a selection step of, in making the switching of the thread which is an object of processing in the arithmetic unit, selecting the second register corresponding to the thread which becomes an object of execution after the switching by seeing a register identification table prepared in a state where the halt thread and the second register storing the data on the halt thread are associated with each other, an interchange step of interchanging the data stored in the second register selected in the selection step and the data stored in the first register, and an update step of updating the register identification table on the basis of the interchange result in the interchange step.

The present invention can provide an advantage of conducting the reading processing from a register at a high speed even in the case of the multithread processing.

BRIEF DESCRIPTION OF THE DRAWINGS

FIG. 8 is an illustration useful for explaining a processing method in an in-order execution type;

FIG. 9 is an illustration useful for explaining a processing method in an out-of-order execution type;

FIG. 11 is an illustration for explaining an SMT method; and

DESCRIPTION OF THE PREFERRED EMBODIMENTS

An embodiment of the present invention will be described hereinbelow with reference to the drawings.

Figure 1:
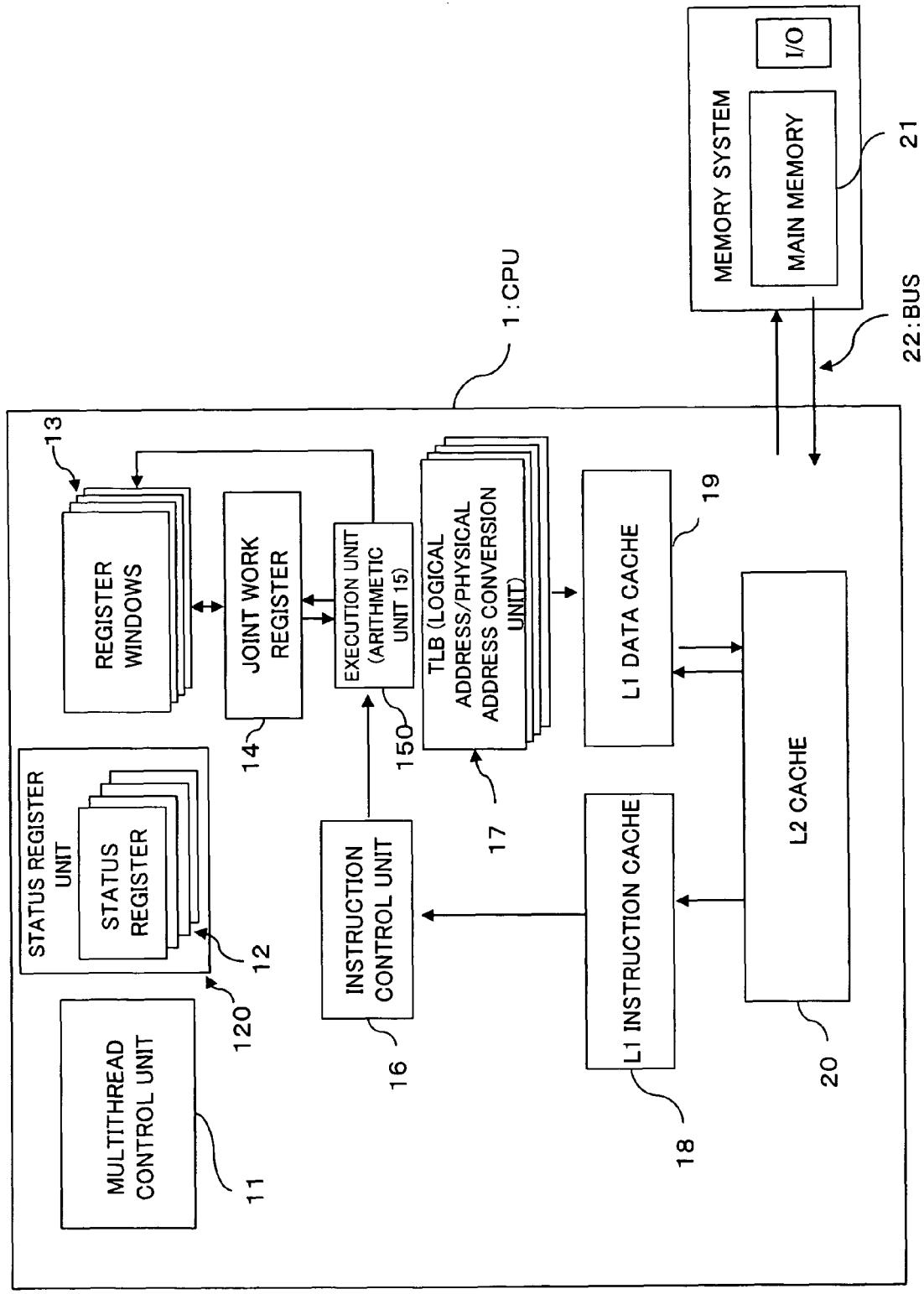
FIG. 1 is a block diagram showing a configuration of a multithread processor according to an embodiment of the present invention.
Figure 2:
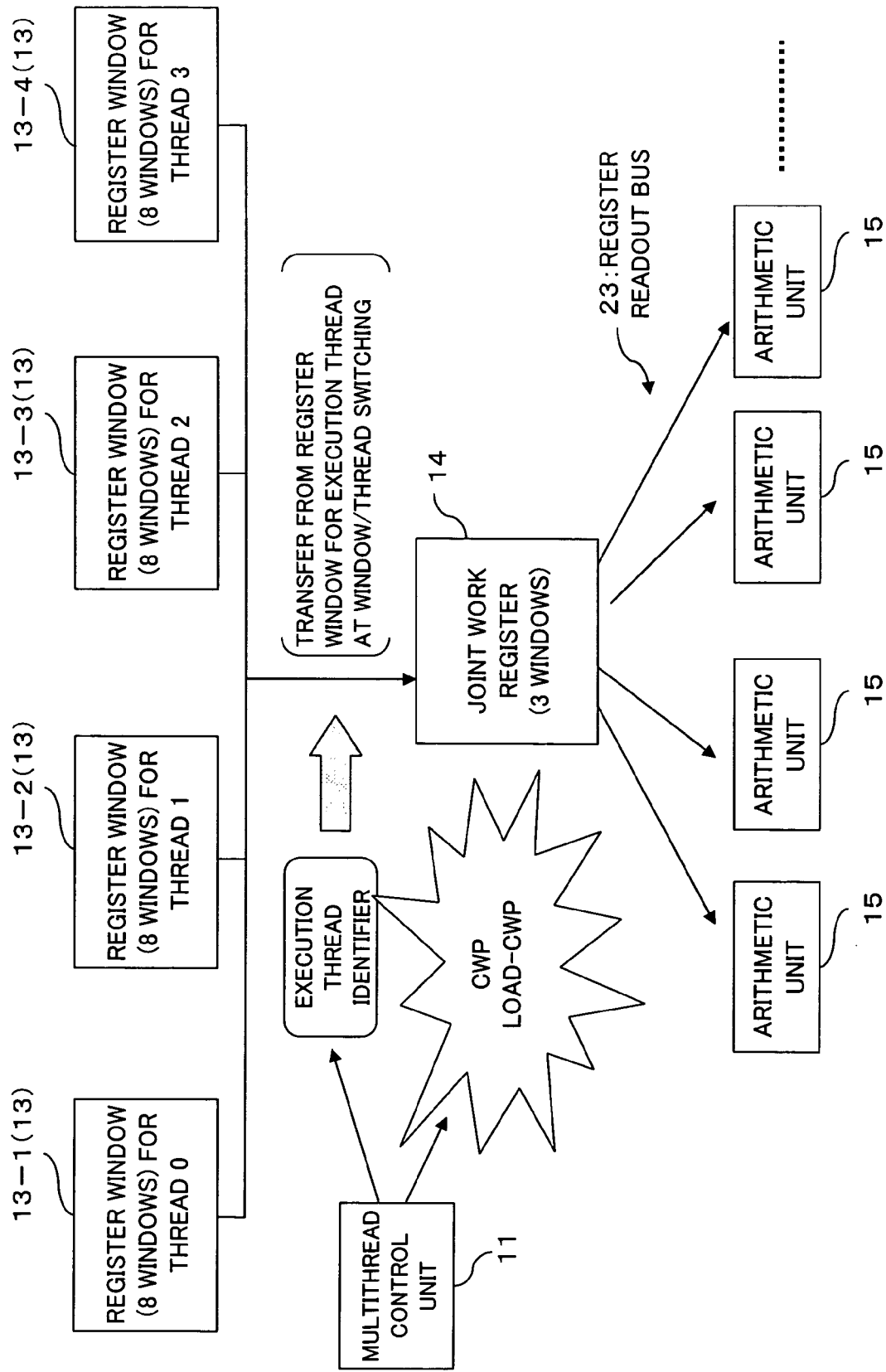
FIG. 2 is an illustration useful for explaining a functional configuration of a joint work register of a multithread processing according to an embodiment of the present invention.
Figure 3:
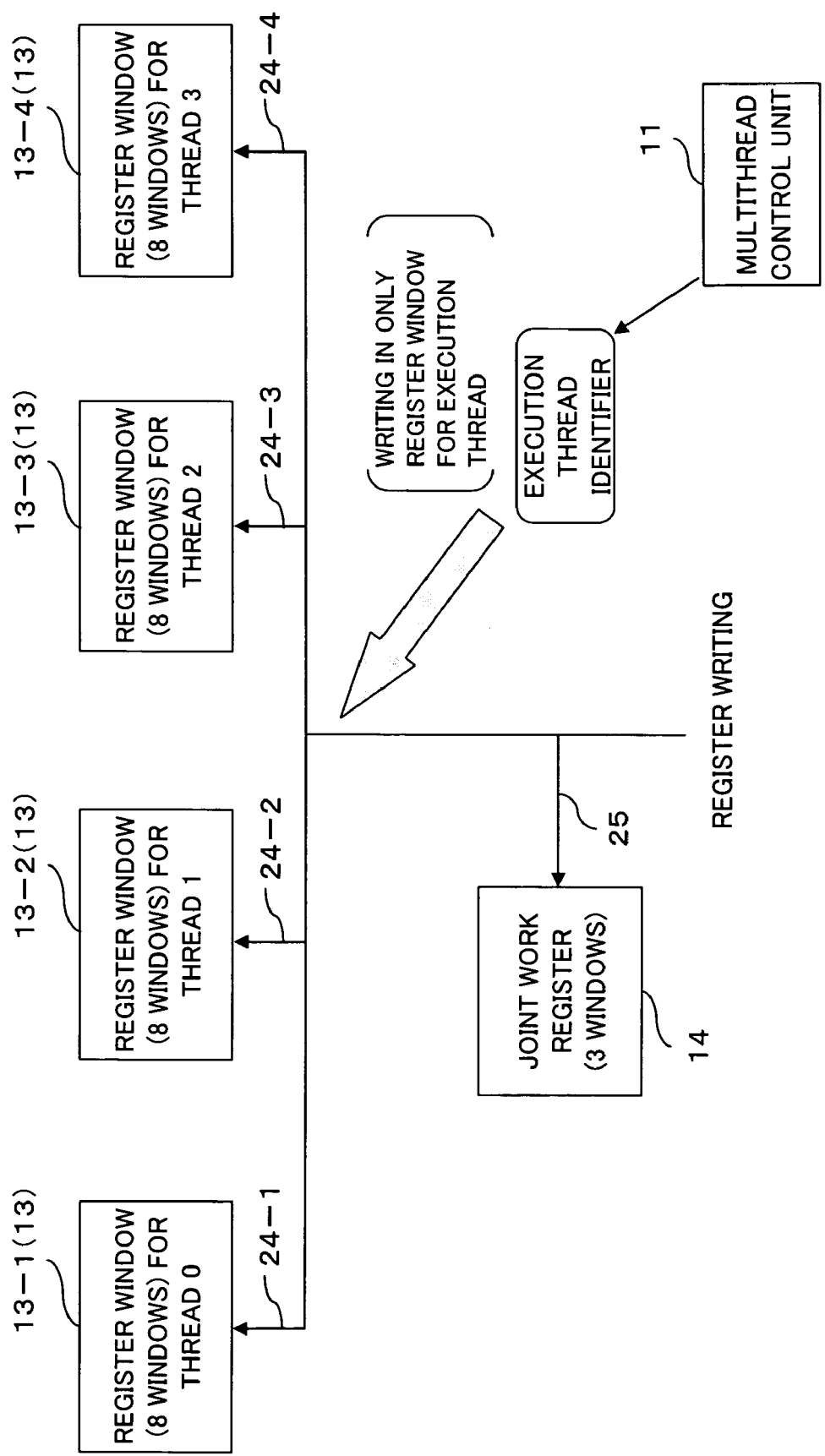
FIG. 3 is an illustration useful for explaining a functional configuration of a joint work register of a multithread processing according to an embodiment of the present invention.

FIG. 1 is a block diagram showing a configuration of a multithread processor according to an embodiment of the present invention, and FIGS. 2 and 3 are illustrations useful for explaining the functional configuration of a joint work register of this multithread processor.

A CPU (Central Processing Unit) 1 serving as a multithread processor according to an embodiment of the present invention is a processor having an architecture according to a register window mode (method) (mentioned in detail later) such as SPARC (Scalable Processor ARChitecture; produced by Sun Microsystems Co., Ltd.) and designed so that a plurality of threads (programs) is executable in parallel through the use of one or more arithmetic units 15 (see FIG. 2).

As FIG. 1 shows, this CPU 1 is made up of a multithread control unit 11, a status register unit 120, register windows 13, a joint work register (work register) 14, an execution unit 150, an instruction control unit 16, a TLB (logical address/physical address conversion unit) 17, an L1 instruction cache 18, an L1 data cache 19, and an L2 cache 20, and it is made to be communicable through a bus 22 with a main memory 21.

The L1 instruction cache 18 is a primary cache for storing an instruction executed by the execution unit 150, and the L1 data cache 19 is a primary cache for storing various data used for the execution of an instruction in the execution unit 150. The L2 cache 20 is a secondary cache for storing various instructions and data.

The instruction control unit 16 is for carrying out the control so that instructions are acquired from the primary instruction cache 18, the L2 cache 20 and the main memory 21 to be executed in the execution unit 150, and the TLB (Translation Look-aside Buffer; logical address/physical address conversion unit) 17 is a kind of cache memory provided for the purpose of reducing a penalty on the page table reference arising due to the conversion from a logical address into a physical address, and is made to preserve the address referred to and the history of the conversion information for realizing the speed-up of the address conversion.

The execution unit (arithmetic unit) 150 is for conducting various types of processing such as operations through the use of the register windows 13, the joint work register 14, the status register 12 and others and, for example, functions as an arithmetic unit (execution arithmetic unit) 15 to carry out various types of arithmetic processing. Moreover, it is connected through a register readout bus 23 to the joint work register 14 (see FIG. 2), and further connected through a register write bus 25 to the joint work register 14, and connected through register write buses 24-1 to 24-4 to the register windows 13-1 to 13-4 (see FIG. 3).

Concretely, the execution unit 150 is connected through the register write bus 24-1 to the register window 13-1, through the register write bus 24-2 to the register window 13-2, through the register write bus 24-3 to the register window 13-3 and through the register write bus 24-4 to the register window 13-4.

The main memory 21 is a memory provided in the exterior of the CPU 1 and is made to store various types of instructions and data. The main memory 21 is connected through a bus 22 to the CPU 1 to be communicable therewith, and the CPU 1 reads out the instructions and data through the bus 22 or the like from this main memory 21 in a case in which instructions and data needed for the processing/execution by the execution unit 150 do not exist in the L1 instruction cache 18, the L1 data cache 19 and the L2 cache 20 (at the occurrence of a cache miss).

Each of the register windows 13 is an storage area capable of storing data to be used for instruction processing in the execution unit 150 and, as shown in FIG. 3, it is provided for each thread. That is, for mounting the multithread, this CPU 1 is configured such that registers (register windows 13) are multiplexed in a corresponding state to the threads. The writing/readout in/from the register windows 13 is made under control of the multithread control unit 11 which will be described later. As one example, in the following description of this embodiment, the CPU 1 carries out (processes) four threads 0 to 3 in parallel, and this CPU 1 is equipped with four register windows 13-1 to 13-4.

As reference numerals designating the register windows, numerals 13-1 to 13-4 will be used when there is a need to specify one of a plurality of register windows, while numeral 13 will be used when indicating an arbitrary register window. Moreover, although, in general, a register to be placed in a processor or the like is actually constructed as a set of a plurality of registers (register group) each capable of retaining data of several bits, in this embodiment, it will be referred to simply as a "register" for convenience only.

In the example shown in FIG. 2, the threads 0, 1, 2 and 3 use the register windows 13-1, 13-2, 13-3 and 13-4, respectively, and the multithread control unit 11 carries out the control so that these register windows 13-1 to 13-4 share the joint work register 14. Moreover, in FIG. 2, an arithmetic unit 15 is shown for each arithmetic operation.

The joint work register (work register) 14 is placed between the aforesaid plurality of (four) register windows 13 and the execution unit 150, and data is mutually transferable between each register window 13 and the execution unit 150. That is, the joint work register 14 is made to store data transferred from each register window 13 or to transfer data to each register window 13. The data related to a thread to be executed in the arithmetic unit 15 is put in the joint work register 14, and the arithmetic unit 15 conducts various types of arithmetic operations through the use of the data stored in this joint work register 14.

Meanwhile, according to this register window mode, for example, one window is composed of 32 words, and one window is made up of an 8-word global register, an 8-word in-register, an 8-word out-register and an 8-word local register. The description of this embodiment will be given in the case of the number of windows=8, that is, an example of 8 windows.

Figure 4:
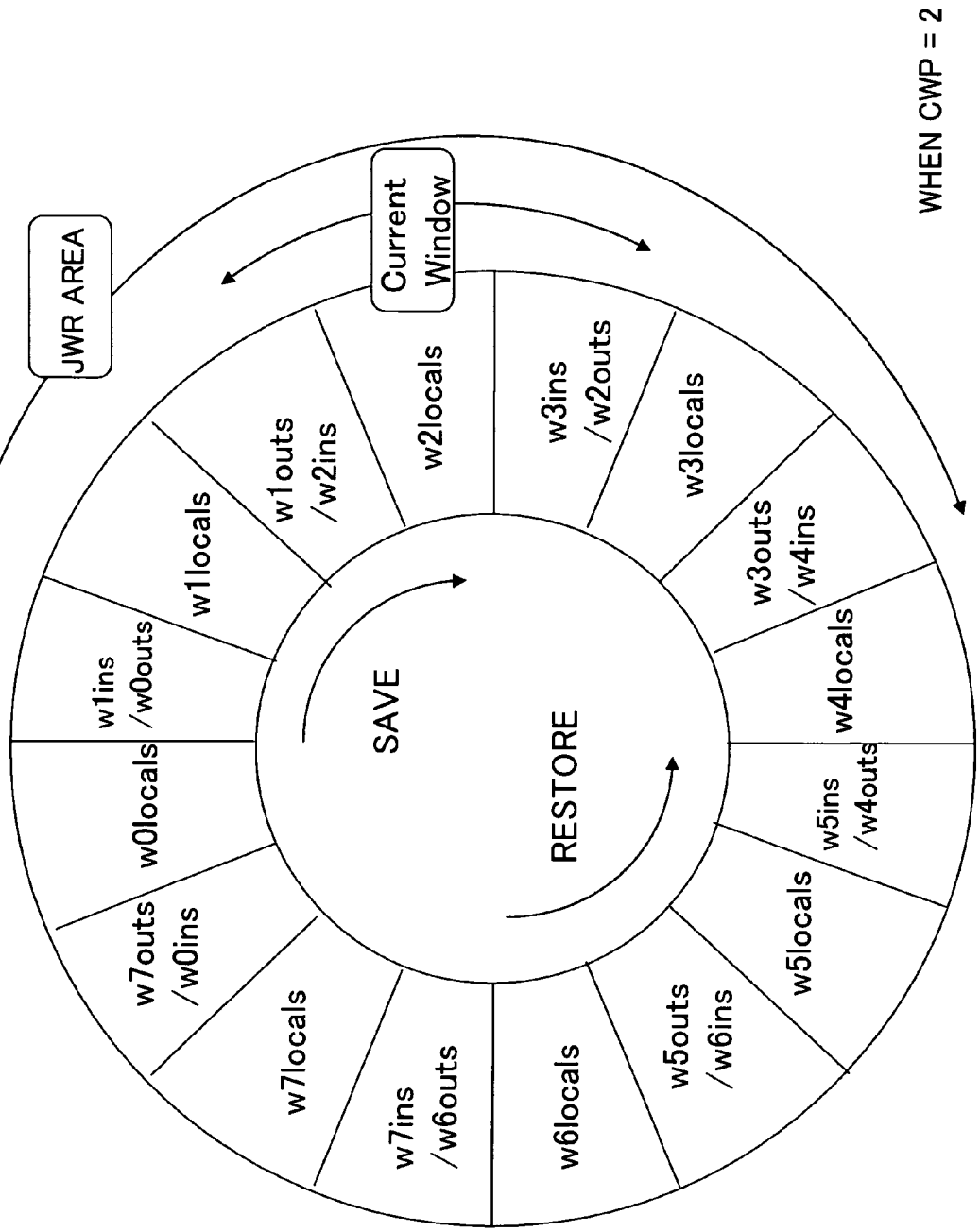
FIG. 4 is an illustration useful for explaining a register window mode.

FIG. 4 is an illustration useful for explaining a register window mode (system). In the register window mode employed in this CPU 1, as shown in FIG. 4, a plurality of register windows are connected into a ring-like configuration.

In this register window mode, as shown in FIG. 4, the current window is indicated using a CWP (Current Window Pointer), and the register having the window number indicated by this CWP can be handled at a time by means of a program. FIG. 4 shows an example of CWP=2.

Moreover, at a subroutine call, a SAVE instruction is executed to update the CWP by +1, and at a subroutine return, a RESTORE instruction or a RETURN instruction is executed to update the CWP by −1. When updated by +1 by the window pointer, the 8 word of the out register (outs) of the window before the updating of +1 are handled as in-register (ins) and, conversely, when updated by −1, the in-register of the window before the updating of −1 is handled as an out-register. Thus, it and the adjacent window share 8 words.

The global register does not vary even if the window pointer is changed, and is replaced only at special processing such as the occurrence of interrupt processing.

In addition, by the update of the CWP, i.e., the switching of the window, the processing becomes feasible through the use of a new register, which reduces the penalty loss stemming from the memory saving of the register.

In the register window shown in FIG. 4, the current window specified by the CWP and both the windows adjacent thereto are referred to as a joint work register JWR (Joint-Work-Register) area. Concretely, this JWR area is made as a total of 64-word area including in-registers, out-registers and local registers corresponding to three windows of CWP, CWP+1 and CWP−1 and global registers unrelated to the CWP.

For the execution of SAVE instructions, RESTORE instructions and RETURN instructions most used for the window switching, since the adjacent windows have already been stored in the JWR area also in the case of the window being switched, without interlocking instruction processing, the CWP is updated and the register readout in the adjacent windows becomes possible. Moreover, when the aforesaid instruction comes to an end, one adjacent window is further transferred to the JWR area in the background.

In addition, the data in this JWR area is stored in the aforesaid joint work register 14.

Still additionally, the writing of data such as arithmetic results in the arithmetic unit 15 in the joint work register 14 and the readout of data from the joint work register 14 are made under control of the multithread control unit 11.

The multithread control unit 11 is for controlling the data transfer among the plurality of register windows 13, the work register 14 and the arithmetic unit(s) on the basis of an execution thread identifier used for identifying a thread which is an object of processing execution in the execution unit 150 (arithmetic unit 15).

As FIG. 3 shows, this multithread control unit 11 carries out the control so that both the joint work register 14 and the register window 13 corresponding to the thread related to an instruction perform the register (data) update at the completion of the instruction in the execution unit 150 (register update step). Moreover, during the thread execution in the arithmetic unit 15, the register readout is made by the joint work register 14.

In addition, when making the switching of the thread which is an object of processing in the arithmetic unit 15, the multithread control unit 11 controls the data transfer so that data is transferred from the register window 13 corresponding to the thread which becomes an object of execution after the switching to the joint work register 14 (data transfer step).

Still additionally, when making the switching of the thread which is an object of processing in the arithmetic unit 15, the multithread control unit 11 stalls an execution pipeline in an instruction decoding stage until the data transfer from the register window 13 corresponding to the thread which becomes an object of execution after the switching to the joint work register 14 reaches completion and this data is readable from the joint work register 14 by the arithmetic unit 15.

Figure 5:
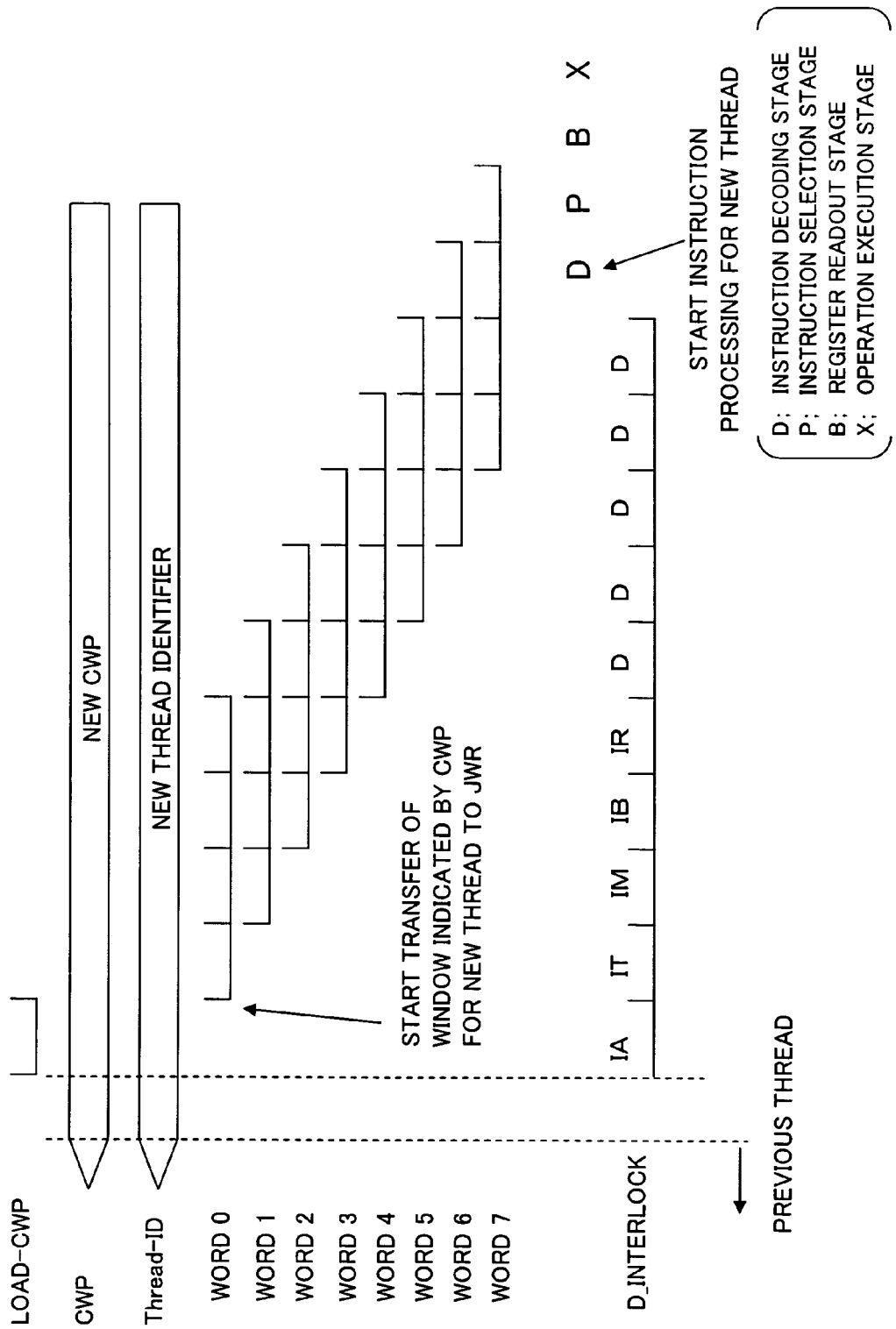
FIG. 5 is an illustration of an example of a start timing of instruction processing on a thread in a multithread processing according to an embodiment of the present invention.

FIG. 5 is an illustration of an example of an instruction processing start timing on a thread in this CPU 1. For example, when the thread switching is made at the occurrence of a cache miss or at a timing that a predetermined period of time elapses after the last thread switching, the CWP is first replaced with a new thread and a LOAD-CWP signal or a CWP is then transmitted from the multithread control unit 11, and a new thread identifier is transmitted from this multithread control unit 11. The transfer from the register window 13 to the joint work register 14 starts in response to a LOAD-CWP signal, and a register window for a new thread is selected with reference to a thread identifier at that time.

Meanwhile, in the example shown in FIG. 5, for transferring a register corresponding to three windows from the register window 13 to the joint work register 14, nine cycles are necessary. Since difficulty is experienced in reading out data from the joint work register 14 into the arithmetic unit 15 during this time, as shown in FIG. 5, the multithread control unit 11 performs the interlock (D_interlock) for stalling the execution pipeline at an instruction decoding stage.

Figure 6:
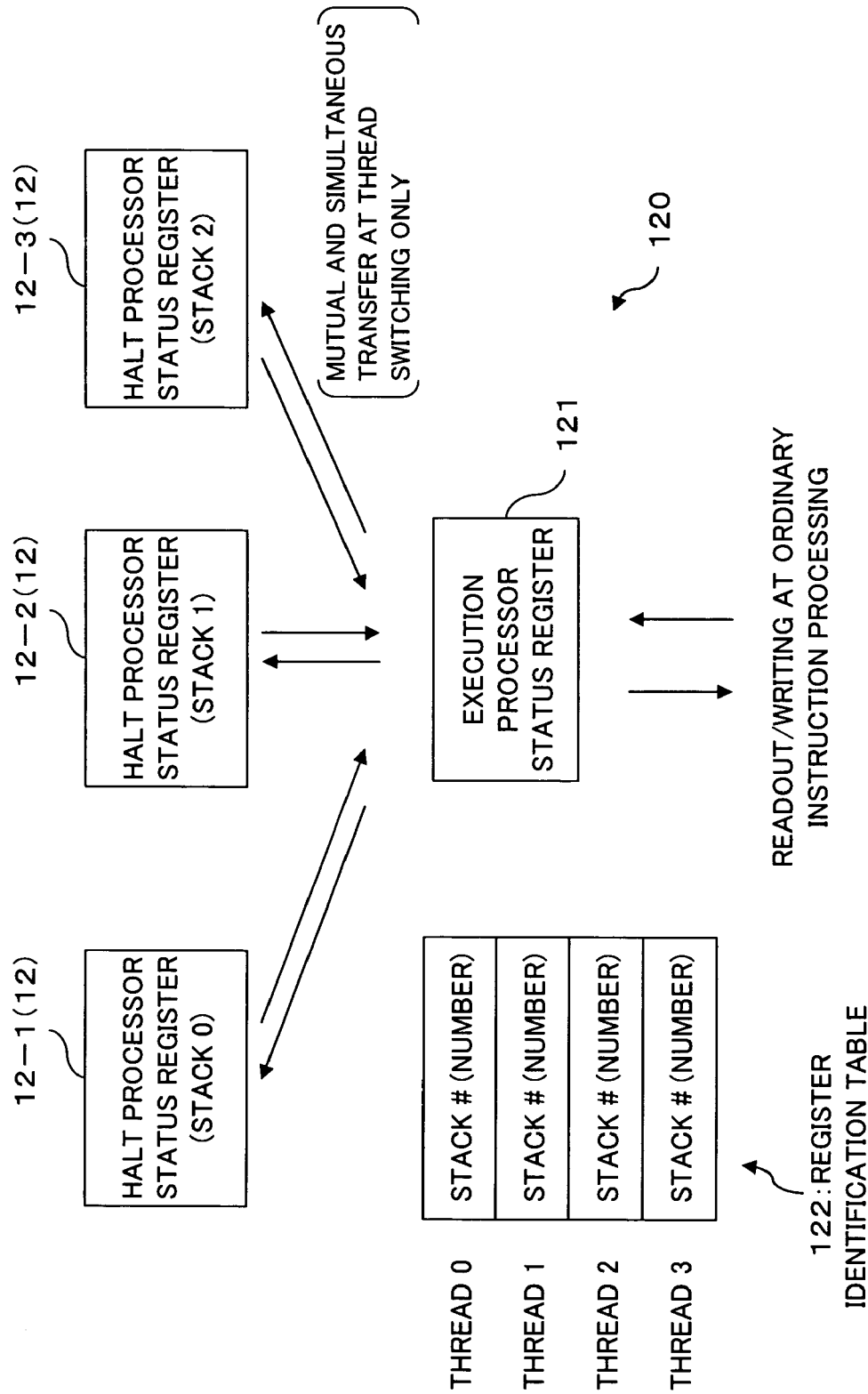
FIG. 6 is an illustration useful for explaining a configuration of a status register unit of a multithread processing according to an embodiment of the present invention.
Figure 7:
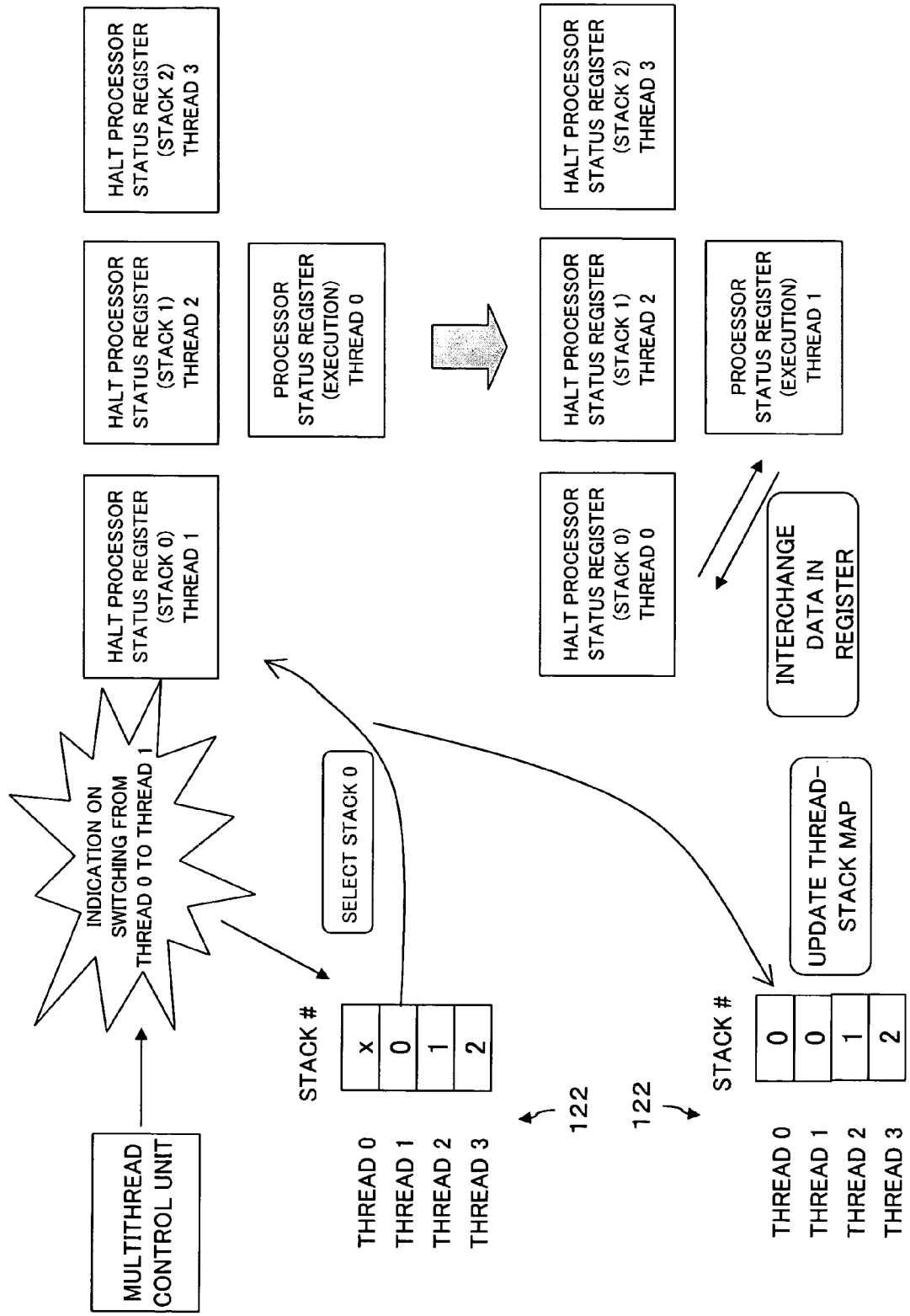
FIG. 7 is an illustration useful for explaining the processing in a status register unit at thread switching in a multithread processing according to an embodiment of the present invention.
Figure 10A:
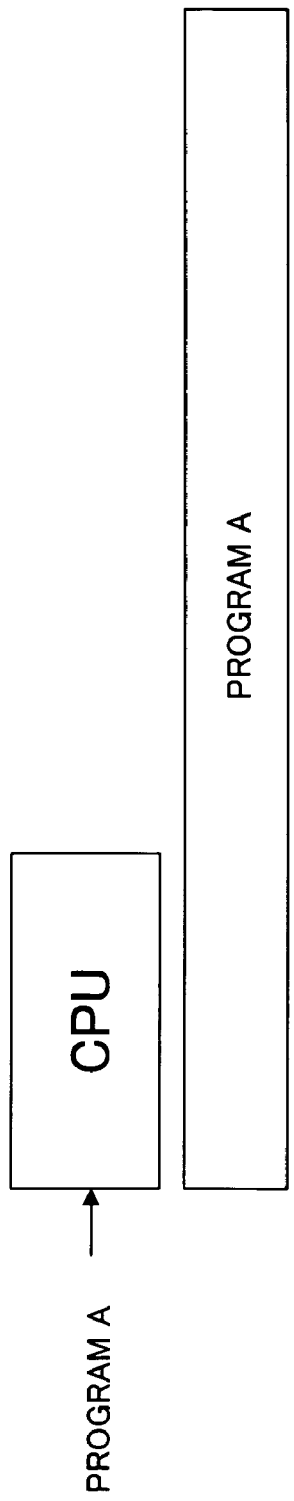
FIGS. 10A and 10B are illustrations for explaining a multithread processor system.
Figure 10B:
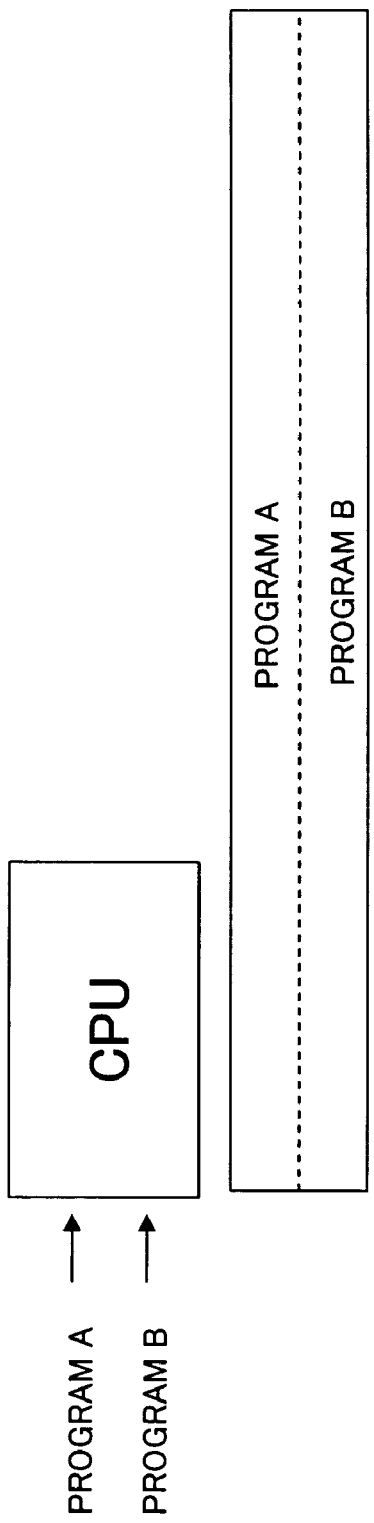
Figure 12:
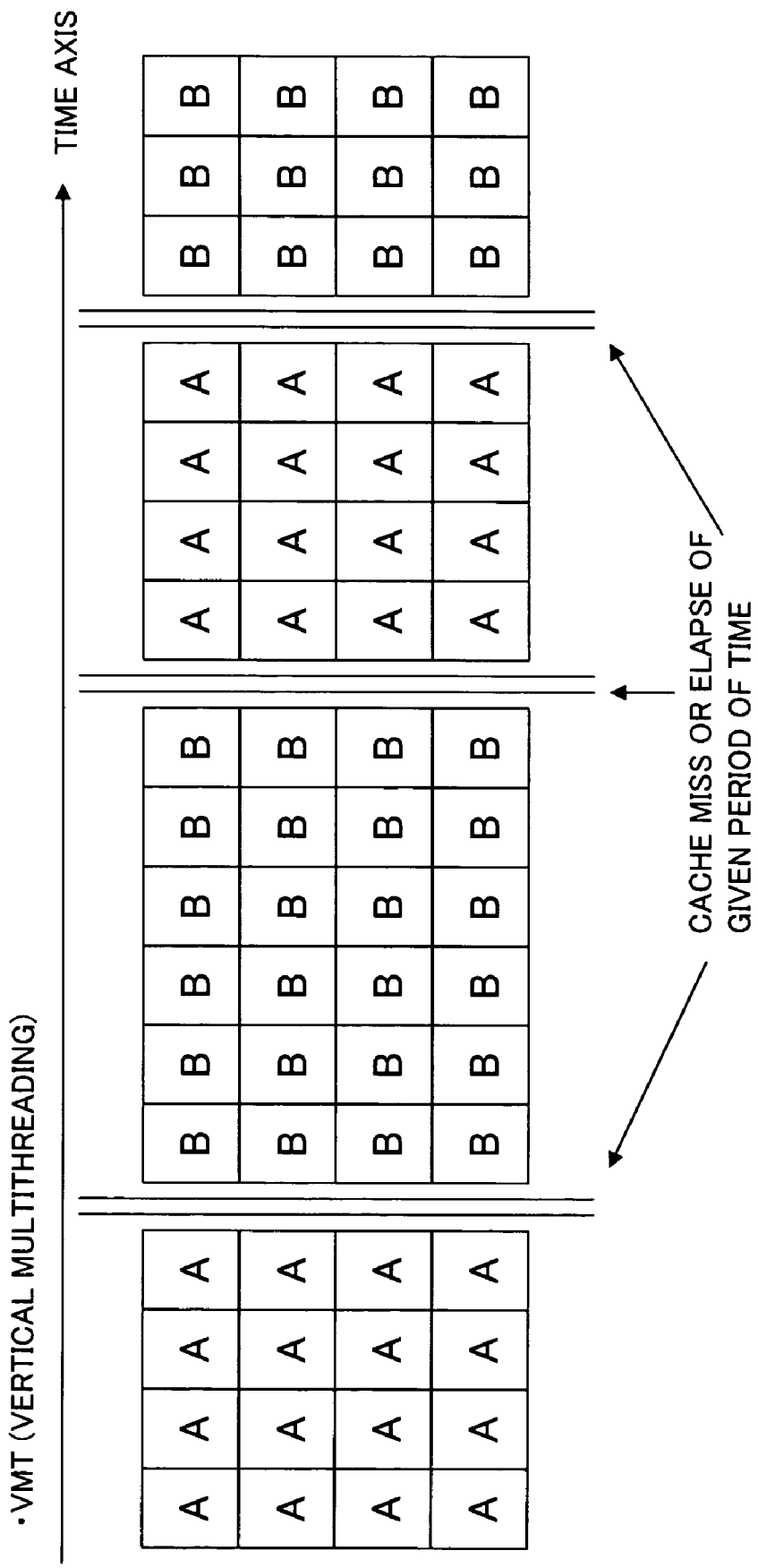
FIG. 12 is an illustration for explaining a VMT method.

FIG. 6 is an illustration useful for explaining a configuration of the status register unit 120 in the multithread processor according to the embodiment of the present invention, and FIG. 7 is an illustration useful for explaining the processing in the status register unit 120 at the thread switching.

For example, the status register unit 120 is for preserving information indicative of a status of a processor, such as a state of an execution result in a case in which the execution unit 150 carries out an arithmetic instruction and, as shown in FIG. 6, it is composed of a halt processor status registers (second registers) 12-1, 12-2, 12-3, an execution processor status register (first register; hardware control processor status register) 121 and a register identification table 122.

The execution processor status register 121 is capable of storing data on, of a plurality of threads, an execution object thread to be executed by the arithmetic unit 15 and, in this embodiment, it is one in number.

The halt processor status registers (second registers) 12-1 to 12-3 are capable of mutually transfer the data with respect to the execution processor status register (first register) 121 (the data is mutually transferable therebetween), and capable of storing data on, of the plurality of threads, halt threads other than the execution object thread, with the halt processor status registers 12-1 to 12-3 being equal in number to the halt threads (in this embodiment, three in number).

Incidentally, as the reference numerals designating the halt processor status registers, numerals 12-1 to 12-3 will be used when there is a need to specify one of a plurality of halt processor status registers 12, while numeral 12 will be used when indicating an arbitrary halt processor status register.

Furthermore, the multithread control unit 11 (register control unit) is made to control the data transfer between the halt processor status register 12 and the execution processor status register 121 and includes the register identification table 122 made out in a state where a halt thread and the data on that halt thread are associated with each other so as to control the data transfer by referring to this register identification table 122.

In this connection, in this embodiment, the register identification table 122 manages the thread number of a halt thread and a storage position (physical stack; stack # (number)) of the halt processor status register 12 related to that halt thread in a state associated with each other (thread-stack map).

Still furthermore, when making the switching of a thread which is an object of processing in the arithmetic unit 15, the multithread control unit 11 sees the register identification table 122 to select the halt processor status register 12 corresponding to a thread (execution object thread) which becomes an object of execution after switched (selection step), and further interchanges the data stored in this halt processor status register 12 with the data stored in the execution processor status register 121 and updates the register identification table 122 to a state after interchanged.

That is, for the switching between threads, as shown in FIG. 7, the multithread control unit 11 newly recognizes an execution object thread on the basis of an execution thread identifier and, when a thread switching control unit issues an instruction on the switching from the thread (thread 0 in the example shown in FIG. 7), which is presently in execution, to the execution object thread (thread 1 in the example shown in FIG. 7) which newly comes into an execution state, the multithread control unit 11 refers to the register identification table 122 for acquiring the stack number (stack 0) of the halt processor status register 12 related to the execution object thread (thread 1).

The multithread control unit 11 transfers data from the acquired stack 0 to the execution processor status register 121 and, since the stack 0 becomes free, transfers the data in the execution processor status register 121 to the stack 0. In this way, the interchange of the in-register data is made between the selected halt processor status register 12 and the execution processor status register 121 (interchange step).

Yet furthermore, the multithread control unit 11 updates the register identification table 122 (update step). That is, the stack number 0 of the thread 1 which will next become an execution state is copied at the stack number corresponding to the thread 0 in the register identification table 122. This means that the stack number 0 is written therein.

Incidentally, in the register identification table 122, at the stack # corresponding to the thread which is currently in execution, the number stacked before the execution is left as it is (see thread 1 in the register identification table 122 after updated in FIG. 7).

Moreover, the interchange between the processor status registers is done in one cycle since an instruction fetch on a new thread starts immediately after the thread switching. Since the processing cycle is limited in comparison with the data transfer from a register window to the joint work register 14 which is simultaneously made, the interlock is specially necessary for the transfer of the processor status register.

As described above, with the CPU 1 according to the embodiment of the present invention, in the processor having an architecture in the register window mode and equipped with the joint work register 14 including the current window, in the case of the multithread processing in which the thread switching is made in response to the occurrence of a cache miss or the elapse of a given period of time, different threads (registers) share the joint work register 14 when the window registers 14 are multiplexed for the multithread, which enables the arithmetic unit 15 to conduct the register readout at a high speed as in the case of no multithread.

In addition, the multiplexed register windows 13, equal in number to the threads, and the joint work register 14 are made to be mutually communicable with each other so that a plurality of threads can share the joint work register 14, which enables mounting the multithread and conducting the register readout during the thread execution as in the case of no multithread processing.

Still additionally, at the instruction completion, simultaneously with the writing in the joint work register 14, the register writing is also made with respect to the register window, which eliminates the need for the rewriting processing from the joint work register 14 into the register window and enables the speed-up of the processing. That is, this only requires that, at the thread switching, the transfer is made from the register window 13 of the thread, which next comes into an execution state, to the joint work register 14 but it does not require that the data on the thread before switched is transferred from the joint work register 14 to the register window related to that thread.

Yet additionally, with respect to a register, such as a processor status register indicative of a status of the CPU 1, which does not have a work register (joint work register) because the possibility of reference exists at all times, the execution processor status register 121 and the halt processor status register 12 for a halt thread are provided so as to, whenever the thread switching is made, interchange the contents of the execution processor status register 121 with the corresponding halt processor status register 12 and store it therein so that only the execution processor status register is used at the execution of the thread, which enables the register reference at a high speed as in the case of no multithread.

According to the present invention, in a processor employing a multithread system in which a thread to be executed is switched in response to a cache miss or the elapse of a given period time as a trigger, the register windows 13 are multiplexed and share the register readout joint work register (work register) 14, which, even if the registers increase due to the multithread, enables the register readout during the instruction processing in a thread execution state to be made at high speed as in the case of no employment of the multithread mode. Moreover, also with respect to a status register which does not have a work register, the execution processor status register 121 and the halt processor status register 12 are provided so as to, at the thread switching, interchange the execution processor status register 121 with a stack storing a thread to be executed next, which, even if the registers increase due to the multithread, enables the register readout during the instruction processing in a thread execution state to be made at high speed as in the case of no employment of the multithread mode.

Furthermore, it should be understood that the present invention is not limited to the above-described embodiment, and that it is intended to cover all changes and modifications of the embodiment of the invention herein which do not constitute departures from the spirit and scope of the invention.

For example, although in the above-described embodiment four threads are executed as the multithread, the present invention is not limited to this, but it is also acceptable to execute three threads or less, or five threads or more.

Moreover, although in the above-described embodiment a status register is used as an example of a register having no work register, the present invention is not limited to this, but the above-described method is also applicable to other registers other than the status register.

The disclosure of each embodiment of the present invention enables a person having ordinary skull in the art to implement and manufacture the present invention.

The present invention is also applicable to register control when the multithread processing is conducted in a processor, such as SPARC, having a relatively large register area.

What is claimed is:

1. A multithread processor which carries out a plurality of threads in parallel through the use of one or more arithmetic units, comprising:

a plurality of register windows each provided for each of said threads and made to store data to be used for instruction processing in said arithmetic unit;

a work register made to mutually transfer said data with respect to said plurality of register windows and said arithmetic unit, the work register being shared by the plurality of register windows and occupied by one of the plurality of threads at a time; and a multithread control unit for controlling data transfer among said plurality of register windows, said work register and said arithmetic unit on the basis of an execution thread identifier for identifying said thread to be executed in said arithmetic unit, wherein said multithread control unit carries out register data update at the completion of an instruction in said arithmetic unit with respect to said work register and said register window corresponding to said thread related to the instruction completion, and when switching said thread that is an object of processing in said arithmetic unit, said multithread control unit controls the data transfer without transferring, from the work register to the register window, data on a thread before the switching so that the updated data is transferred from said register window corresponding to said thread, which becomes an object of execution after the switching, to said work register.

2. The multithread processor according to claim 1, wherein, when making the switching on said thread which is an object of processing in said arithmetic unit, said multithread control unit stalls an execution pipeline in an instruction decoding stage until the transfer of said data from said register window corresponding to said thread, which becomes an object of execution after the switching, to said work register reaches completion and said data becomes readable from said work register by said arithmetic unit.

3. The multithread processor according to claim 1, further comprising:
   a first register made to store data on, of said plurality of threads, an execution object thread to be executed in said arithmetic unit;
   a second register made to mutually transfer said data with respect to said first register and made to store data on, of said plurality of threads, a halt thread other than said execution object thread, with said second register being equal in quantity to said halt thread; and
   a register control unit for controlling data transfer between said second register and said first register.

4. The multithread processor according to claim 2, further comprising:
   a first register made to store data on, of said plurality of threads, an execution object thread to be executed in said arithmetic unit;
   a second register made to mutually transfer said data with respect to said first register and made to store data on, of said plurality of threads, a halt thread other than said execution object thread, with said second register being equal in quantity to said halt thread; and
   a register control unit for controlling data transfer between said second register and said first register.

5. The multithread processor according to claim 3, further comprising a register identification table prepared in a state where said halt thread and said second register storing said data on said halt thread are associated with each other so that said register control unit controls the data transfer by referring to said register identification table.

6. The multithread processor according to claim 4, further comprising a register identification table prepared in a state where said halt thread and said second register storing said data on said halt thread are associated with each other so that said register control unit controls the data transfer by referring to said register identification table.

7. The multithread processor according to claim 5, wherein, when making the switching on said thread which is an object of processing in said arithmetic unit, said register control unit refers to said register identification table to select said second register corresponding to said thread which becomes an object of execution after the switching so that said data stored in the selected second register and said data stored in said first register are interchanged with each other and said register identification table is updated on the basis of a result of the data interchange.

8. The multithread processor according to claim 6, wherein, when making the switching on said thread which is an object of processing in said arithmetic unit, said register control unit refers to said register identification table to select said second register corresponding to said thread which becomes an object of execution after the switching so that said data stored in the selected second register and said data stored in said first register are interchanged with each other and said register identification table is updated on the basis of a result of the data interchange.

9. A register control method for use in a multithread processor which carries out a plurality of threads in parallel through the use of one or more arithmetic units and including a plurality of register windows each provided for each of said threads and made to store data to be used for instruction processing in said arithmetic unit and a work register made to mutually transfer said data with respect to each of said plurality of register windows, the work register being shared by the plurality of register windows and occupied by one of the plurality of threads at a time, said method comprising:
   a register updating step of carrying out register update at the completion of an instruction in said arithmetic unit with respect to both said work register and said register window corresponding to said thread related to the instruction completion; and
   a data transfer step of, in making the switching on said thread which is an object of processing in said arithmetic unit, transferring said data, updated in said register updating step, from said register window corresponding to said thread, which becomes an object of execution after the switching, to said work register; and
   when switching said thread that is an object of processing in said arithmetic unit, controlling the data transfer without transferring, from the work register to the register window, data on a thread before the switching so that the updated data is transferred from said register window corresponding to said thread, which becomes an object of execution after the switching, to said work register.

10. The register control method according to claim 9, further comprising a stall step of, in making the switching on said thread which is an object of processing in said arithmetic unit, stalling an execution pipeline in an instruction decoding stage until the transfer of said data from said register window corresponding to said thread, which becomes an object of execution after the switching, to said work register reaches completion and said data becomes readable from said work register by said arithmetic unit.

* * * * *